«UNITED STATES PATENT OFFICE.»

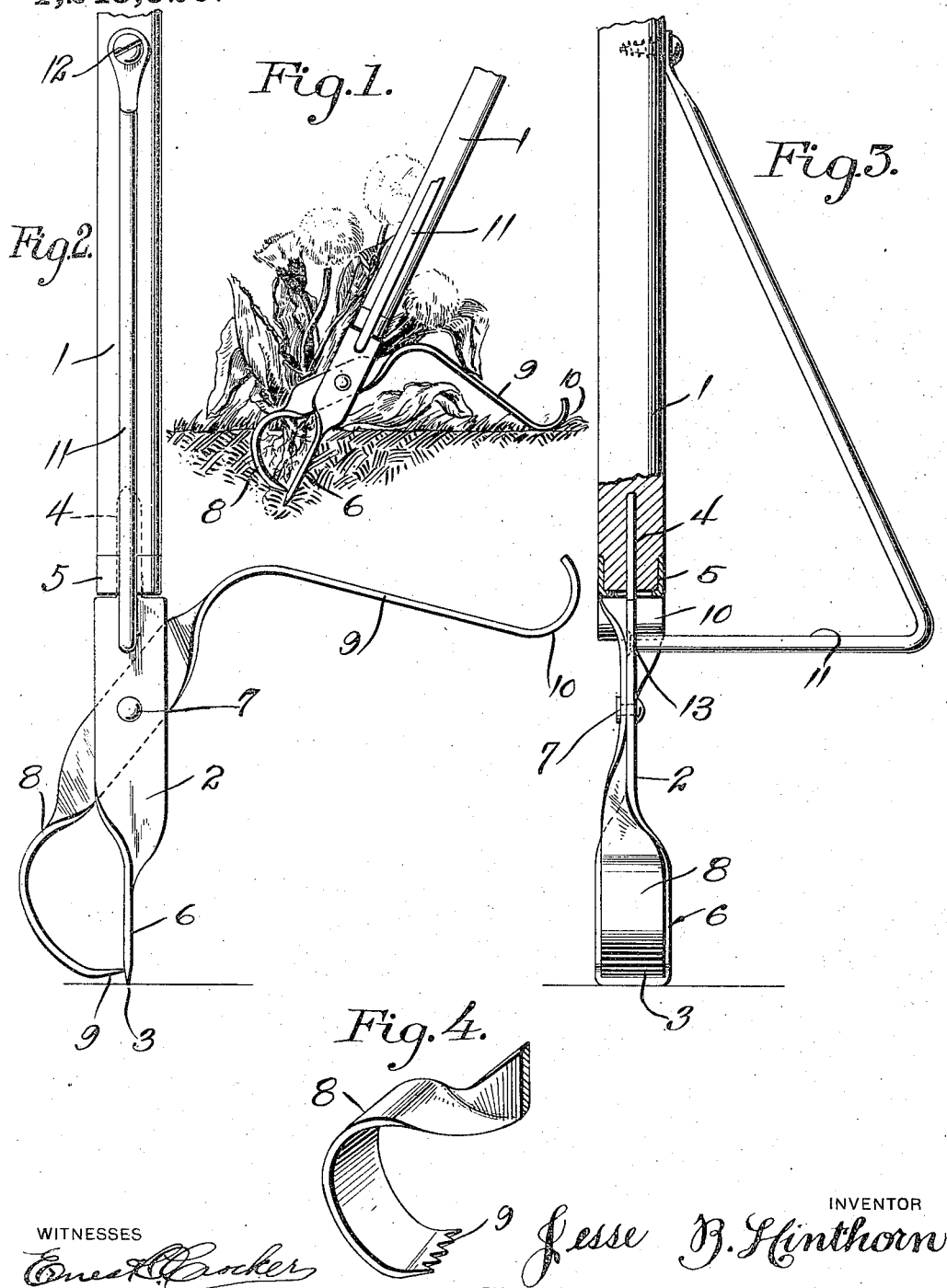
J. B. HINTHORN.
WEED PULLER.
APPLICATION FILED MAR. 21, 1916.
1,245,920. Patented Nov. 6, 1917.

JESSE B. HINTHORN, OF CHESTER, NEBRASKA.

WEED-PULLER.

1,245,920.  Specification of Letters Patent.  Patented Nov. 6, 1917.

Application filed March 21, 1916. Serial No. 85,640.

*To all whom it may concern:*

Be it known that I, JESSE B. HINTHORN, a citizen of the United States, residing at Chester, in the county of Thayer and State of Nebraska, have invented certain new and useful Improvements in Weed-Pullers, of which the following is a specification.

This invention relates to weed pullers and more particularly to the class of weed pullers which are employed to extract the roots of dandelion plants or other obnoxious weeds from lawns or other places where weeds of this character abound.

The invention further aims to provide a weed puller which may be employed without danger of doing material injury to the lawn and one which will destroy the roots of the plant or weed and thereby prevent it from again flourishing.

A further object of this invention is the provision of a weed puller which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which, Figure 1 is a side elevation of the device showing it in operation.

Fig. 2 is an enlarged side elevation.

Fig. 3 is an edge elevation the handle shown partly in section.

Fig. 4 is a fragmentary perspective view of the gripping finger.

The handle 1 is provided which may be of any suitable length and has attached at one end thereof the blade 2 which is provided with a sharpened edge 3 at its free end and a tongue 4 at its opposite end whereby it may be inserted in the end of the handle for securely fastening to the handle. The end of the handle is provided with a ferrule 5 to prevent the handle from cracking or splitting when the tongue is driven into the end thereof. The blade 2 is twisted so that its end 6 which constitutes, in addition to performing the function of a blade, one of the gripping members for gripping the roots of a weed, and is disposed at right angles to the upper portion 2 of the blade.

Pivotally mounted in a pivot pin 7 which is carried by the upper portion of the blade, is a gripping finger 8 which is curved and provided at its end with a plurality of gripping teeth 9 which are adapted to contact with the point of the blade 6 when the device is in operation. The pivoted portion of the gripping finger is disposed at right angles to the curved portion of the gripping finger, and lies against the side of the upper portion of the blade 2 so that it may be pivotally mounted upon the pivot pin 7. An extension 9 is provided in the end of the upper edge which forms the gripping finger and is curved at its free end as indicated by the numeral 10, the transverse face of the extension lying in the same plane with the transverse face of the gripping finger 8 and is adapted to contact with the ground when the device is in operation.

For inserting the blade in the ground the device is provided with a stirrup 11 which consists of a piece of angularly bent rod having one of its ends secured to the handle 1 by means of the fastening screw 12 and its opposite end securely fastened to the upper portion of the blade 2 as indicated by the numeral 13. The foot of the operator may be inserted in the stirrup 11 and a pressure applied thereto will cause the blade 6 to insert itself in the ground. When it is desired to remove the weed from the ground, the blade will first be inserted in the ground as close to the roots of the plant or weed as possible and the handle will be tilted until the device is in the position shown by Fig. 1 of the drawing which will cause the gripping finger 8 to insert itself in the ground and contact with the blade or gripping member 6 and continued tilting of the blade will cause the curved portion 10 to act as a pivot point for the device whereby the roots, being tightly held by the gripping members will be withdrawn from the ground.

From the foregoing it will be observed that a very simple and durable weed puller has been provided, the details of which embody the preferred form. I desire it to be understood however, that slight changes or modifications in the minor details of construction may be made without departing from the spirit of the invention or the scope of the claims hereunto appended.

I claim:

1. A weed puller comprising, the combination with a handle, of a blade carried by the handle and formed of a flat strip of metal, a tongue formed on the end of the said strip and engaged with the end of the said handle, a gripping member pivotally mounted upon the blade and formed of a flat metal strip, each of the said strips being twisted adjacent their ends whereby the end of both of the said blades will be disposed in parallelism, one of the terminals of the said gripping blade being engageable with the said first mentioned blade, the opposite end of the said gripping blade being curved to provide a fulcrum for the said handle when the said gripping blade is operated and means carried by the said blade for receiving a pressure to force the blade into the ground independently of the said gripping blade.

2. A weed puller comprising, the combination with a handle, of a blade carried by the handle and formed of a flat strip of metal, a tongue formed on the end of the said strip and engaged with the end of the said handle, a gripping member pivotally mounted upon the blade and formed of a flat metal strip, each of the said strips being twisted adjacent their ends whereby the end of both of the said blades will be disposed in parallelism, one of the terminals of the said gripping blade being engageable with the said first mentioned blade at a point slightly spaced away from the terminal thereof, the opposite end of the said gripping blade being curved to provide a fulcrum for the said handle when the said gripping blade is operated, one of the said blades being normally disposed vertically, and a stirrup carried by the said handle and the said vertical blade for permitting the said vertical blade to be thrust into the ground independently of the said gripping blade.

In testimony whereof I affix my signature in presence of two witnesses.

JESSE B. HINTHORN.

Witnesses:
R. H. ATWOOD,
E. M. THOMAS.

Copies of this patent may be obtained for five cents each, by addressing the "Commissioner of Patents, Washington, D. C."